(12) United States Patent
Kim et al.

(10) Patent No.: US 12,671,081 B2
(45) Date of Patent: Jun. 30, 2026

(54) METHOD OF PREPARING CARBON-SILICON COMPOSITE POWDER, CARBON-SILICON COMPOSITE POWDER PREPARED USING THE SAME, AND LITHIUM SECONDARY BATTERY INCLUDING THE SAME

(71) Applicant: GRAPSIL CO., LTD., Chungcheongnam-do (KR)

(72) Inventors: Huijin Kim, Chungcheongnam-do (KR); Hyunki Park, Seoul (KR); Jungsu Park, Jeollanam-do (KR)

(73) Assignee: GRAPSIL CO., LTD., Chungcheongnam-do (KR)

( * ) Notice: Subject to any disclaimer, the term of this patent is extended or adjusted under 35 U.S.C. 154(b) by 518 days.

(21) Appl. No.: 18/263,857

(22) PCT Filed: Apr. 25, 2022

(86) PCT No.: PCT/KR2022/005879

§ 371 (c)(1),
(2) Date: Aug. 1, 2023

(87) PCT Pub. No.: WO2022/231243

PCT Pub. Date: Nov. 3, 2022

(65) Prior Publication Data

US 2024/0120464 A1      Apr. 11, 2024

(30) Foreign Application Priority Data

Apr. 28, 2021     (KR) ........................ 10-2021-0054903

(51) Int. Cl.
| | |
|---|---|
| *H01M 4/36* | (2006.01) |
| *C01B 32/21* | (2017.01) |
| *C01B 33/02* | (2006.01) |
| *H01M 4/02* | (2006.01) |
| *H01M 4/38* | (2006.01) |
| *H01M 4/583* | (2010.01) |
| *H01M 4/62* | (2006.01) |
| *H01M 10/052* | (2010.01) |

(52) U.S. Cl.
CPC ............. *H01M 4/364* (2013.01); *C01B 32/21* (2017.08); *C01B 33/02* (2013.01); *H01M 4/386* (2013.01); *H01M 4/583* (2013.01);

*H01M 4/625* (2013.01); *H01M 10/052* (2013.01); *C01P 2004/03* (2013.01); *C01P 2004/80* (2013.01); *H01M 2004/021* (2013.01); *H01M 2004/027* (2013.01)

(58) Field of Classification Search
CPC .... H01M 10/052; H01M 4/625; H01M 4/583; H01M 4/386; H01M 4/364; C01B 33/02; C01B 32/21
See application file for complete search history.

(56) References Cited

FOREIGN PATENT DOCUMENTS

| | | |
|---|---|---|
| JP | 2013-225501 A | 10/2013 |
| KR | 10-2015-0128432 A | 11/2015 |
| KR | 10-2020-0036622 A | 4/2020 |
| KR | 10-2020-0065562 A | 6/2020 |
| KR | 10-2244226 B1 | 4/2021 |

OTHER PUBLICATIONS

International Search Report and Written Opinion for corresponding International application No. PCT/KR2022/005879; dated Aug. 8, 2022 (11 pages) Machine Translation.

*Primary Examiner* — Sarah A. Slifka
(74) *Attorney, Agent, or Firm* — Mendelsohn Dunleavy, P.C.

(57) ABSTRACT

Disclosed are a method of preparing a carbon-silicon composite powder including A) adding crystalline carbon and a precursor of amorphous carbon to a silicon slurry containing silicon particles and a dispersion medium to prepare a first mixed solution containing silicon particles, crystalline carbon and the precursor of amorphous carbon in a weight ratio of 20 to 70:20 to 70:1 to 19, B) spray drying the first mixed solution to prepare a first composite powder, C) adding the first composite powder to an aqueous solvent containing carbon fibers to prepare a second mixed solution, D) subjecting the second mixed solution to cold isostatic pressing, followed by drying to prepare a second composite powder, and E) screening the second composite powder without pulverization to prepare a carbon-silicon composite powder, a carbon-silicon composite powder produced using the same, and a lithium secondary battery including the same.

15 Claims, 2 Drawing Sheets

Comparative Example 1

Example 1

Comparative Example 2

Example 1

METHOD OF PREPARING CARBON-SILICON COMPOSITE POWDER, CARBON-SILICON COMPOSITE POWDER PREPARED USING THE SAME, AND LITHIUM SECONDARY BATTERY INCLUDING THE SAME

TECHNICAL FIELD

The present invention relates to a method of preparing a high-capacity carbon-silicon composite powder with excellent conductivity, a carbon-silicon composite powder produced using the same, and a lithium secondary battery with excellent lifespan characteristics, output characteristics, and safety, including the carbon-silicon composite powder as an anode active material.

BACKGROUND ART

Lithium secondary batteries are widely used as power sources for mobile electronic devices including mobile phones and application fields thereof are expanding in response to increasing demand for large devices such as electric vehicles.

Meanwhile, most currently commercialized lithium secondary batteries use a carbon-based material as an anode active material, but attempts have recently been made to use metal materials such as Si, Sn, and Al that exhibit higher capacities as materials that can replace carbon-based anode active materials. However, these metal materials cause great volume expansion and contraction during lithium intercalation and deintercalation, disadvantageously resulting in undifferentiation, loss of conduction path, and the like, and thus deterioration in overall battery performance.

In order to solve this disadvantage, efforts are made to simply mix various carbon materials with Si. However, carbon in the carbon material simply mixed with Si may be released from Si as Si undergoes large volume expansion and contraction during charge and discharge. For this reason, disadvantageously, lifespan characteristics are greatly deteriorated due to deteriorated electrical conductivity. In addition, sieving using a mesh with a predetermined size is required after firing and pulverization due to the agglomeration of carbon materials used as an adhesive. In this process, the shape of the anode active material collapses and a great amount of powder having a particle size of several hundred nanometers or less is observed. For this reason, disadvantageously, the efficiency of a lithium secondary battery using the same was lowered.

DISCLOSURE

Technical Problem

The present invention has made to overcome the drawbacks and disadvantages of the prior art and technical problems that have yet to be resolved in the art.

It is one object of the present invention to provide a method of preparing a high-capacity carbon-silicon composite powder with excellent conductivity and a carbon-silicon composite powder produced using the same.

It is another object of the present invention to provide a lithium secondary battery having excellent lifespan and output characteristics and safety including the carbon-silicon composite powder as an anode active material.

Technical Solution

In accordance with one aspect of the present invention, the above and other objects can be accomplished by the provision of a method of preparing a carbon-silicon composite powder including:

A) adding crystalline carbon and a precursor of amorphous carbon to a silicon slurry containing silicon particles and a dispersion medium to prepare a first mixed solution containing silicon particles, crystalline carbon and the precursor of amorphous carbon in a weight ratio of 20 to 70:20 to 70:1 to 19;

B) spray drying the first mixed solution to prepare a first composite powder;

C) adding the first composite powder to an aqueous solvent containing carbon fibers to prepare a second mixed solution;

D) subjecting the second mixed solution to cold isostatic pressing (CIP), followed by drying to prepare a second composite powder; and E) screening the second composite powder without pulverization to prepare a carbon-silicon composite powder.

The silicon particles may have an average particle diameter (D50) of 10 nm to 1,000 nm.

A weight ratio of the silicon particles to the dispersion medium may be 1:99 to 30:70.

The spray drying may be performed at 50 to 300° C.

A weight ratio of the first composite powder to the carbon fibers in the second mixed solution may be 70:30 to 99.9:0.1.

A weight ratio of the first composite powder to the aqueous solvent containing carbon fibers may be 1:1 to 1:2.

The second mixed solution may contain a dispersant to disperse the first composite powder in an amount of 0.01 to 1% by weight based on the total weight of the first composite powder.

The cold isostatic pressing (CIP) may be performed by injecting the second mixed solution into a container formed of rubber and then applying an isostatic pressure of 50 to 2,500 atm thereto using a cold isostatic press.

Drying may be performed at 70 to 300° C. after the cold isostatic pressing (CIP).

The carbon-silicon composite powder may have a porosity of 0.1 to 5%.

The carbon-silicon composite powder may have a spherical shape.

The carbon-silicon composite powder may have D90 of 20 μm to 80 μm.

In accordance with another aspect of the present invention, provided is a carbon-silicon composite powder prepared using the method.

In accordance with another aspect of the present invention, provided is an anode active material including the carbon-silicon composite powder.

In accordance with another aspect of the present invention, provided is a lithium secondary battery including the anode active material.

Advantageous Effects

According to the present invention, it is possible to prepare a carbon-silicon composite powder, the shape of which is maintained without pulverization and that exhibits excellent process reactivity by preventing a carbon material and silicon particles from lumping in the process of preparing a carbon-silicon composite powder, thereby providing a lithium secondary battery with improved lifespan and output characteristics using the same.

In addition, the carbon-silicon composite powder prepared according to the present invention is compressed to minimize voids, and thus effectively blocks contact between the silicon particles and the electrolyte solution, thereby imparting safety to lithium secondary batteries.

BEST MODE

Figure 1:
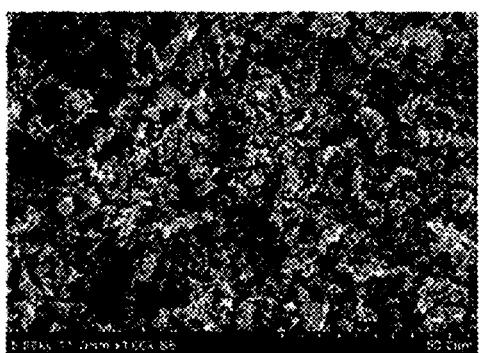
FIG. 1 is an SEM image showing carbon-silicon composite powders according to Example 1 and Comparative Example 1.
Figure 1:
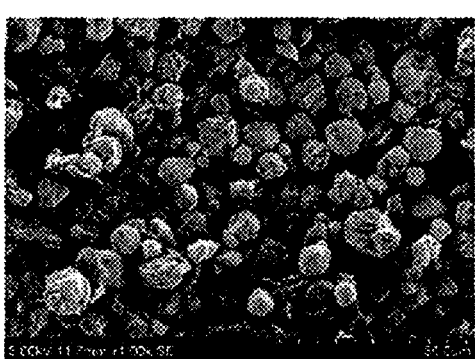

The present invention provides a method of preparing a carbon-silicon composite powder including:

A) adding crystalline carbon and a precursor of amorphous carbon to a silicon slurry containing silicon particles and a dispersion medium to prepare a first mixed solution containing silicon particles, crystalline carbon and a precursor of amorphous carbon in a weight ratio of 20 to 70:20 to 70:1 to 19;

B) spray drying the first mixed solution to prepare a first composite powder;

C) adding the first composite powder to an aqueous solvent containing carbon fibers to prepare a second mixed solution;

D) subjecting the second mixed solution to cold isostatic pressing (CIP), followed by drying to prepare a second composite powder; and E) screening the second composite powder without pulverization to prepare a carbon-silicon composite powder.

According to the present invention, it is possible to prepare a carbon-silicon composite powder that retains a spherical or substantially spherical shape and thus has a predetermined particle diameter without pulverization by preventing the carbon material and silicon particles from lumping in the process of preparing the carbon-silicon composite powder, thereby providing excellent reaction fairness. In addition, a lithium secondary battery using such a carbon-silicon composite powder as an anode active material effectively exhibits high-capacity silicon characteristics and alleviates volume expansion problems during charge and discharge, thereby improving lifespan and output characteristics.

In step A), the first mixed solution may be prepared by adding crystalline carbon and the precursor of amorphous carbon to the silicon slurry.

The silicon slurry may be separately prepared by thoroughly dispersing the silicon particles in a dispersion medium before mixing the crystalline carbon and the precursor of amorphous carbon. At this time, the silicon particles are used as a slurry without exposure to the atmosphere, thus suppressing oxidation. For this purpose, the capacity of the used lithium secondary battery may be further improved.

The silicon particles may have an average particle diameter (D50) of 10 nm to 1,000 nm. Disadvantageously, when the average particle diameter (D50) of the silicon particles is smaller than the lower limit of the range, process efficiency is reduced, and when the average particle diameter is larger than the upper limit of the range, micronization, contact with the electrolyte solution, or the like may occur during charge and discharge. Specifically, the average particle diameter may be 50 nm to 300 nm.

The average particle diameter (D50) of the silicon particles means a particle size at 50% of the particles in the cumulative distribution curve depending on the size of the particles. In another example, D90 means a particle size at 90% of the particles in the cumulative distribution curve of the particles.

The dispersion medium may, for example, include one selected from the group consisting of N-methyl-2-pyrrolidone (NMP), tetrahydrofuran (THF), water, ethanol, methanol, cyclohexanol, cyclohexanone, methyl ethyl ketone, acetone, ethylene glycol, octyne, diethyl carbonate, dimethyl sulfoxide (DMSO), and combinations thereof, but is not limited thereto.

The weight ratio of the silicon particles to the dispersion medium may be 1:99 to 30:70. When the weight ratio does not fall within the range defined above, disadvantageously, silicon particles or the like agglomerate into lumps or uniform dispersion of silicon particles in the dispersion medium is difficult. Specifically, the weight ratio of the silicon particles to the dispersion medium may be 5:95 to 20:80.

The first mixed solution may be prepared by adding crystalline carbon and a precursor of amorphous carbon to the silicon slurry such that the weight ratio of the silicon particles, the crystalline carbon, and the precursor of amorphous carbon is 20 to 70:20 to 70:1 to 19.

Any one may be used as the crystalline carbon without limitation as long as it is well-known in the art and is insoluble in the dispersion medium of the silicon slurry. For example, the crystalline carbon may be selected from the group consisting of natural graphite, artificial graphite, expanded graphite, graphene, fullerene soot and combinations thereof, but is not limited thereto.

When the content of the crystalline carbon is excessively small, below the above range, it is difficult to obtain the effect of improving electrical conductivity, and when the content of the crystalline carbon is excessively great, above the above range, disadvantageously, lithium ion conductivity may be lowered and output characteristics may be lowered.

The precursor of amorphous carbon may be dissolved in the dispersion medium of the silicon slurry, and there is no limitation as to the precursor as long as it is known in the art. For example, the precursor of amorphous carbon may include at least one selected from the group consisting of coal-based pitch, mesophase pitch, petroleum-based pitch, coal-based oil, petroleum heavy oils, organic synthetic pitch, phenol resins, furan resins, and polyimide resins. The precursor of amorphous carbon is carbonized in the subsequent carbonization to form amorphous carbon.

When the content of the precursor of amorphous carbon is excessively small, below the above range, it is difficult to provide appropriate strength and thus maintain the shape of the powder, and when the content of the precursor of amorphous carbon is excessively large, the powder may agglomerate due to the use of an adhesive during the preparation process, resulting in a prolonged pulverization process, conversion of the spherical powder into amorphous powder, and deterioration in the overall characteristics of the battery using the same.

Specifically, the weight ratio of the silicon particles, crystalline carbon and the precursor of amorphous carbon in the first mixed solution may be 40 to 50:40 to 50:5 to 15.

In step B), the first composite powder may be prepared by spray drying the first mixed solution.

The spray drying may be performed by a general drying method including rotational spraying, nozzle spraying, ultrasonic spraying, or a combination thereof, and the flow rate of the solution during spraying, spraying pressure, spraying speed, temperature, or the like may be performed in an appropriate manner controlled depending on the average particle diameter of the first composite powder. Specifically, the spray drying may be performed at a temperature of 50 to 300° C.

After the spray drying, a spherical first composite powder having an average particle diameter (D50) of 1 μm to 100 μm and a porosity of 20 to 40% may be obtained.

In step C), the second mixed solution may be prepared by adding the first composite powder to an aqueous solvent containing carbon fibers.

The carbon fibers may, for example, include at least one selected from carbon fibers, single-walled carbon nanotubes, multiwalled carbon nanotubes, carbon nanowires, and modified forms thereof, but are not limited thereto.

The aqueous solvent may, for example, include at least one selected from the group consisting of distilled water, methanol, ethanol, isopropyl alcohol, ethylene glycol, diethylene glycol, glycerol, and oleic acid, but is not limited thereto.

At this time, the second mixed solution may be prepared such that the weight ratio of the first composite powder to the carbon fibers is 70:30 to 99.9:0.1. When the content of the carbon fiber does not fall within the range defined above, disadvantageously, it is difficult to sufficiently secure electrical conductivity of the prepared carbon-silicon composite powder or processability may be deteriorated.

The second mixed solution may be prepared by adding the first composite powder to an aqueous solvent containing carbon fibers in a weight ratio of 1:1 to 1:2. Outside the above range, disadvantageously, the first composite powder cannot be sufficiently dispersed in an aqueous solvent containing carbon fibers.

In some cases, in order to effectively disperse the first composite powder, a dispersant may be added in an amount of 0.01 to 1% by weight based on the total weight of the first composite powder.

The dispersant may be, for example, PVDF, stearic acid, resorcinol, polyvinyl alcohol, carbon pitch, or the like and may be first dispersed in an organic solvent such as NMP and then the result may be added to the second mixed solution.

In step D), the second composite powder may be prepared by performing cold isostatic pressing (CIP) on the second mixed solution, followed by drying.

The cold isostatic pressing (CIP) is a process of uniformly applying high pressure in all directions to a desired material using a liquid as a pressure medium. In the present invention, the second mixed solution is sealed in a container made of rubber and is injected into a cold isostatic press, and the particles in the second mixed solution are pressed by applying an isostatic pressure of 50 to 2500 atmospheres (atm) thereto for 0.05 to 2 hours, followed by drying to prepare a second composite powder. The pressure and temperature ranges should be determined so as to minimize the porosity of the second composite powder. When the pressure and temperature do not fall within the ranges, disadvantageously, desired effects cannot be obtained.

The liquid component is not wetted into the powder in the second mixed solution, so effective pressing is possible.

A second composite powder retaining the spherical shape can be prepared by drying at 70 to 300° C. to remove residual solvent and the like after cold isostatic pressing (CIP).

In step E), the carbon-silicon composite powder may be prepared by screening the spherical second composite powder without pulverization.

The carbon-silicon composite powder prepared according to the present invention is compressed to minimize voids, and thus is capable of effectively blocking contact between the active particles and the electrolyte solution, thereby ensuring the safety of a lithium secondary battery using the same. The porosity of the carbon-silicon composite powder may be 0.1 to 5%.

In addition, the carbon-silicon composite powder prepared according to the present invention retains the spherical shape and minimizes agglomeration during the preparation process to prevent formation of lumps. Therefore, a powder having a desired size can be obtained only by a screening process without separate pulverization and thus preparation processability is excellent.

The screening may be performed using, for example, a 200 to 500 mesh sieve to remove a powder having a greater size than a predetermined size. Specifically, the D90 of the carbon-silicon composite powder is 20 μm to 80 μm, thus causing almost no a powder with a size less than 1 μm and preventing deterioration in cell efficiency.

In addition, the present invention provides a carbon-silicon composite powder prepared using the method and an anode active material including the same.

In addition, the present invention provides a lithium secondary battery including the anode active material.

The lithium secondary battery includes a cathode including a cathode active material, an anode including the anode active material, and an electrolyte solution.

The cathode is formed by applying a cathode mix including the cathode active material to a current collector, and the cathode mix may further include a binder and a conductive material, if necessary.

The cathode active material may be, for example, a lithium metal oxide such as $LiNi_{0.8-x}Co_{0.2}AlxO_2$, $LiCo_xMn_yO_2$, $LiNi_xCo_yO_2$, $LiNi_xMn_yO_2$, $LiNi_xCo_yMn_zO_2$, $LiCoO_2$, $LiNiO_2$, $LiMnO_2$, $LiFePO_4$, $LiCoPO_4$, $LiMnPO_4$ and $Li_4Ti_5O_{12}$ (0<x<1, 0<y<1), chalcogenides such as $Cu_2Mo_6S_8$, FeS, CoS, and MiS, oxides, sulfides or halides of scandium, ruthenium, titanium, vanadium, molybdenum, chromium, manganese, iron, cobalt, nickel, copper and zinc, and the like. More specifically, the cathode active material may be $LiNi_{0.8}Co_{0.1}Mn_{0.1}O_2$, $TiS_2$, $ZrS_2$, $RuO_2$, $Co_3O_4$, $Mo_6S_8$, $V_2O_5$, or the like, but is not limited thereto.

The shape of the cathode active material is not particularly limited and may be a particle shape, such as a spherical shape, an elliptical shape, or a rectangular parallelepiped shape. The average particle diameter of the cathode active material may be in the range of 1 to 50 μm, but is not limited thereto. The average particle diameter of the cathode active material may be obtained by, for example, measuring the particle diameters of the active material observed with a scanning electron microscope and calculating an average thereof.

The binder is not particularly limited and may be a fluorine-containing binder such as polyvinylidene fluoride (PVDF) or polytetrafluoroethylene (PTFE), but is not limited thereto.

The content of the binder is not particularly limited as long as the cathode active material can be fixed, and may be in the range of 0 to 10% by weight with respect to the total weight of the cathode.

The conductive material is not particularly limited as long as the conductivity of the cathode can be improved and examples thereof include nickel powder, cobalt oxide, titanium oxide, and carbon. Specifically, the carbon may include at least one selected from the group consisting of Ketjen black, acetylene black, furnace black, graphite, carbon fiber, and fullerene.

The content of the conductive material may be determined in consideration of other battery conditions such as the type of conductive material, and may be, for example, in the range of 1 to 10% by weight with respect to the total weight of the cathode.

The thickness of the cathode mix layer obtained by applying the cathode mixture including the cathode active material, the binder, and the conductive material to the current collector may be, for example, 0.1 micrometers to 1,000 micrometers.

If necessary, the cathode mix may include the solid electrolyte according to the present invention in an amount of 0.1% to 60% by weight, specifically 10% to 50% by weight, based on the total weight of the cathode mix.

The thickness of the cathode mix layer may be, for example, 0.1 micrometers to 1,000 micrometers.

There is no particular limit as to the cathode current collector, so long as it has high conductivity without causing adverse chemical changes in the fabricated battery. Examples of the cathode current collector include stainless steel, aluminum, nickel, titanium, sintered carbon, and aluminum or stainless steel surface-treated with carbon, nickel, titanium, silver or the like. In addition, the current collector may be used in various forms including films, sheets, foils, nets, porous structures, foams and non-woven fabrics having fine irregularities on the surface thereof.

The anode is formed by applying an anode mix including the anode active material to an anode current collector. The anode active material may be the anode active material according to the present invention, but may be used in combination with metal oxide, a metal, lithium composite oxide, crystalline carbon, amorphous carbon, or the like. The anode mix may further include a binder and a conductive material having the configuration as described above.

There is no particular limit as to the anode current collector, so long as it has high conductivity without causing adverse chemical changes in the fabricated lithium secondary battery. Examples of the anode current collector include copper, stainless steel, aluminum, nickel, titanium, sintered carbon, copper or stainless steel surface-treated with carbon, nickel, titanium, silver, or the like, aluminum-cadmium alloys and the like. In addition, like the cathode current collector, the anode current collector may be used in any one of various forms selected from films, sheets, foils, nets, porous structures, foams and non-woven fabrics having fine irregularities on the surface thereof.

The electrolyte solution contains an organic solvent and an electrolyte.

Any one may be used as the organic solvent without limitation as long as it is commonly used and examples thereof include propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxyethane, diethoxyethane, vinylene carbonate, sulfolane, gamma-butyrolactone, propylene sulfite, tetrahydrofuran and combinations thereof.

Any commonly used lithium salt may be used without limitation as the lithium salt that may be contained in the electrolyte and examples of the anion may include at least one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2$ $CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

A separator is disposed between an anode and a cathode to form a battery structure, the battery structure is wound or folded and accommodated in a cylindrical battery case or a prismatic battery case, and then an electrolyte is injected to complete a secondary battery. Alternatively, a battery structure having a bi-cell structure is stacked and impregnated with an electrolyte, and the resulting structure is sealed in a pouch to complete a lithium secondary battery.

Hereinafter, the present invention will be described in more detail with reference to the following examples. However, these examples should not to be construed as limiting the scope of the present invention.

Example 1

A silicon slurry was prepared by mixing 10% by weight of Si with 90% by weight of ethanol. The size (D50) of the silicon was 105 nm. Graphite and pitch were added to a weight ratio of Si:graphite:pitch=45%:45%:10% in the silicon slurry to prepare a first mixed solution. The graphite used herein had a D50 of 3 μm. The pitch used herein had a D50 of 5 μm.

The first mixed solution was dried at 80 to 150° C. using a spray dryer to prepare a spherical first composite powder. The prepared spherical first composite powder had a size (D50) of 11 μm.

The prepared spherical first composite powder was mixed with a solvent containing 0.1 wt % of CNTs having a length of 5 to 15 μm to prepare a second mixed solution. The CNT concentration is a ratio with respect to the mixed powder. The weight ratio of the spherical first composite powder to the solvent is 1:1 to 1:1.5. A dispersion of PVDF in NMP was added as a dispersant to the solvent. The amount of PVDF was 0.1% by weight of the spherical first composite powder. The solvent was prepared by mixing water with ethanol in a weight ratio of 8:2.

The solvent and powder of the second mixed solution were mixed using a rolling mixer for about 2 hours, added to a rubber tube and sealed. The rubber tube was put into a CIP compressor chamber and compressed at a predetermined pressure. At this time, the pressure was 100 atm for 0.1 hours. After completion of the process, the solvent was removed using a centrifugal separator, dried at 100° C. to prepare a second composite powder, and then screened using a 400 mesh sieve to remove more than 90% of the powder with a size of about 30 μm or more to prepare a carbon-silicon composite powder.

Example 2

A carbon-silicon composite powder was prepared in the same manner as in Example 1, except that the CIP process was performed at 200 atm.

Example 3

A carbon-silicon composite powder was prepared in the same manner as in Example 1, except that 0.1% by weight of polyvinylpyrrolidone (PVP) was added to the spherical first composite powder in a solvent and the CIP process was performed at 200 atm.

Comparative Example 1

A carbon-silicon composite powder was prepared in the same manner as in Example 1, except that graphite and pitch were added at a ratio of Si:graphite:pitch=45%:35%:20% in the silicon slurry.

Comparative Example 2

A carbon-silicon composite powder was prepared in the same manner as in Example 1, except that pressing using the CIP process was not performed.

Experimental Example 1

The SEM images of the carbon-silicon composite powders prepared in Example 1 and Comparative Example 1 are shown in FIG. 1.

As can be seen from FIG. 1, the carbon-silicon composite powder according to Example 1 maintains a spherical powder shape, whereas the shape of the carbon-silicon composite powder according to Comparative Example 1 is substantially amorphous, and a large amount of powder with a size of 1 μm or less is observed.

Experimental Example 2

Figure 2:
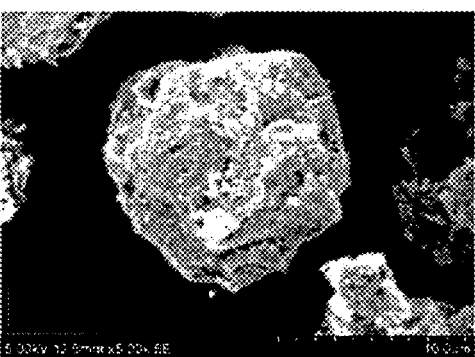
FIG. 2 is an image showing particles constituting carbon-silicon composite powders according to Example 1 and Comparative Example 2.
Figure 2:
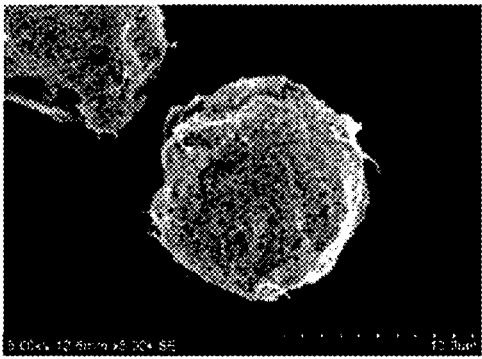

Images of the particles constituting the carbon-silicon composite powders according to Example 1 and Comparative Example 2 are shown in FIG. 2, and porosity thereof was measured using Hg porosimetry.

As can be seen from FIG. 2, the porosity inside the non-compressed powder of Comparative Example 2 was 35%, and the porosity in the compressed powder of Example 1 was 1% or less.

Experimental Example 3

An anode plate produced using, as the anode active material, each of the carbon-silicon composite powders according to Examples 1 to 3, and Comparative Examples 1 and 2, was cut into a circular shape of 1.4875 cm 2 to produce an anode, and a lithium (Li) metal thin film cut into a circular shape of 1.4875 cm 2 was used as a cathode. Here, the anode plate was designed by setting the rolling density to 1.58 g/cc, the current density to 2.8 mA/cm 2, and the electrode capacity to 485 mAh/g. A porous polyethylene separator was interposed between the cathode and the anode, and an electrolyte prepared by dissolving 1M $LiPF_6$ in a solution of 0.5 wt % vinylene carbonate in a mixed solution containing methyl ethyl carbonate (EMC) and ethylene carbonate (EC) mixed at a ratio of 7:3 was inserted to produce a lithium coin half-cell.

The lithium coin half-cell was tested under the conditions of single efficiency: 0.1 C/0.1 C, 50 cycles, and lifespan: 1.0 C/1.0 C, 50 cycles.

The basic charge and discharge conditions are as follows. Charge conditions: CC (constant current)/CV (constant voltage) (0.1V/0.1 C, current cut-off 0.01 C) Discharge condition: CC (constant current), 1.5V cutoff.

Figure 3:
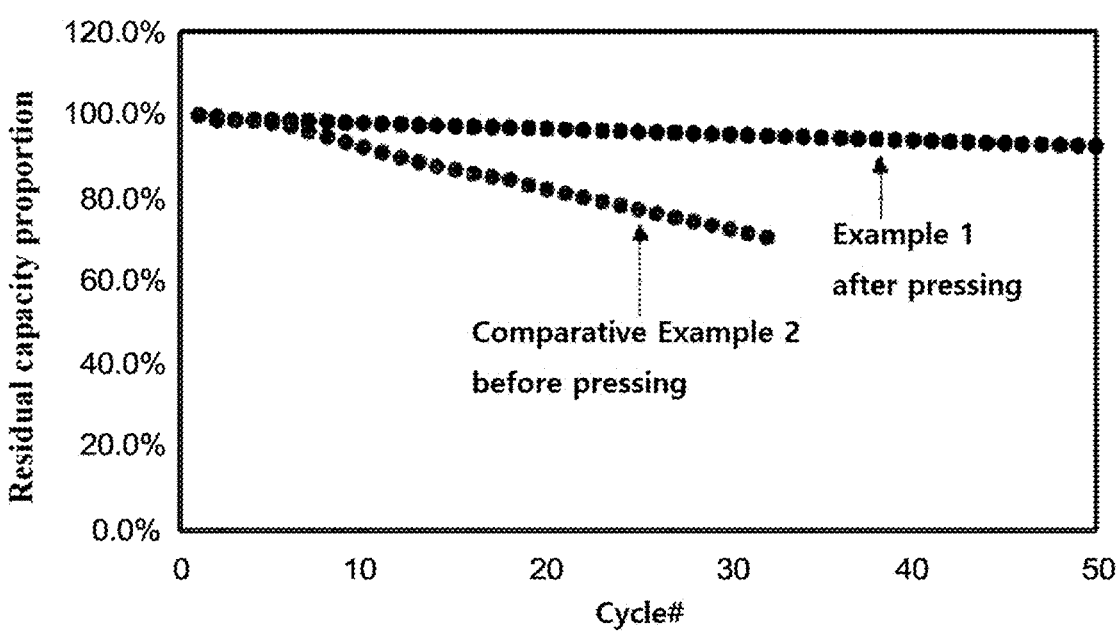
FIG. 3 is a graph showing a proportion of residual capacity of lithium secondary batteries according to Example 1 and Comparative Example 2 as a function of the number of cycles.

Table 1 shows the single efficacy and the lifespan after 50 cycles of the lithium coin half cells according to Examples 1 to 3 and Comparative Example 1. In addition, the residual capacity rates of the lithium coin half cells according to Example 1 and Comparative Example 2 as a function of the number of cycles is shown in FIG. 3.

TABLE 1

|  | Ex. 1 | Ex. 2 | Ex. 3 | Comp. Ex. 1 |
|---|---|---|---|---|
| Single efficacy (%) | 86.70 | 86.10 | 86.50 | 84.20 |
| Lifespan after 50 cycles (%) | 92 | 91.30 | 92.80 | 89.10 |

As can be seen from Table 1, Examples 1 to 3 exhibit excellent initial efficiency and 50 cycle lifespan compared to Comparative Example 1. This is because the carbon-silicon composite powder according to Comparative Example 1 is substantially amorphous and includes a large amount of powder having a size of 1 μm or less, which reduces battery efficiency when applied to the anode. In addition, as can be seen from FIG. 3, Example 1 undergoing pressing exhibits a high residual capacity as a function of the number of cycles, compared to Comparative Example 2 not undergoing pressing.

The invention claimed is:

1. A method of preparing a carbon-silicon composite powder comprising:
   A) adding crystalline carbon and a precursor of amorphous carbon to a silicon slurry comprising silicon particles and a dispersion medium to prepare a first mixed solution comprising silicon particles, crystalline carbon and the precursor of amorphous carbon in a weight ratio of 20 to 70:20 to 70:1 to 19;
   B) spray drying the first mixed solution to prepare a first composite powder;
   C) adding the first composite powder to an aqueous solvent comprising carbon fibers to prepare a second mixed solution;
   D) subjecting the second mixed solution to cold isostatic pressing (CIP), followed by drying to prepare a second composite powder; and
   E) screening the second composite powder without pulverization to prepare a carbon-silicon composite powder.

2. The method according to claim 1, wherein the silicon particles have an average particle diameter (D50) of 10 nm to 1,000 nm.

3. The method according to claim 1, wherein a weight ratio of the silicon particles to the dispersion medium is 1:99 to 30:70.

4. The method according to claim 1, wherein the spray drying is performed at 50 to 300° C.

5. The method according to claim 1, wherein a weight ratio of the first composite powder to the carbon fibers in the second mixed solution is 70:30 to 99.9:0.1.

6. The method according to claim 1, wherein a weight ratio of the first composite powder to the aqueous solvent comprising carbon fibers is 1:1 to 1:2.

7. The method according to claim 1, wherein the second mixed solution comprises a dispersant to disperse the first composite powder in an amount of 0.01 to 1% by weight based on the total weight of the first composite powder.

8. The method according to claim 1, wherein the cold isostatic pressing (CIP) is performed by injecting the second mixed solution into a container formed of rubber and then applying an isostatic pressure of 50 to 2,500 atm thereto using a cold isostatic press.

9. The method according to claim 1, wherein drying is performed at 70 to 300° C. after the cold isostatic pressing (CIP).

10. The method according to claim 1, wherein the carbon-silicon composite powder has a porosity of 0.1 to 5%.

11. The method according to claim 1, wherein the carbon-silicon composite powder has a spherical shape.

12. The method according to claim 1, wherein the carbon-silicon composite powder has D90 of 20 μm to 80 μm.

13. A carbon-silicon composite powder prepared using the method according to claim 1.

14. An anode active material comprising the carbon-silicon composite powder according to claim 13.

15. A lithium secondary battery comprising the anode active material according to claim 14.

* * * * *